United States Patent [19]
Lawson et al.

[11] 3,942,013
[45] Mar. 2, 1976

[54] COMPOSITE FISSION DOSEMETER FOR FAST NEUTRONS

[75] Inventors: Robert Crawford Lawson; David Porter, both of Glasgow; William James Hannan, Airdrie, all of Scotland

[73] Assignee: National Research Development Corporation, London, England

[22] Filed: Nov. 20, 1973

[21] Appl. No.: 417,600

[30] Foreign Application Priority Data
Nov. 22, 1972 United Kingdom............... 53892/72

[52] U.S. Cl................................ 250/391; 250/473
[51] Int. Cl.²......................................... G01T 3/00
[58] Field of Search .......... 250/390, 391, 392, 472, 250/473

[56] References Cited
UNITED STATES PATENTS
3,742,274    6/1973    O'Boyle et al.................. 250/390 X Primary Examiner—Archie R. Borchelt
Attorney, Agent, or Firm—Cushman, Darby & Cushman

[57] ABSTRACT

The present invention concerns a neutron dosemeter particularly applicable to the dosimetry of fast neutrons. According to the invention there is provided a composite detector material consisting of at least two fissile elements, the fission cross-section versus neutron energy response curves of which combine to match the kerma versus neutron energy response of a known biological material.

1 Claim, 1 Drawing Figure

NORMALISED KERMA & COMPOSITE FISSION RESPONSE FUNCTIONS.

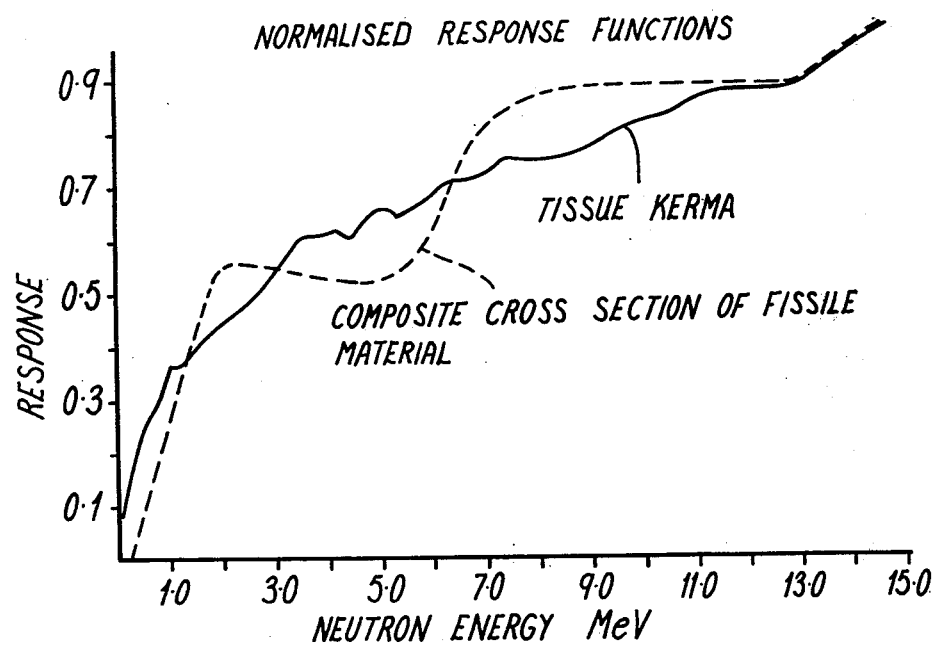
NORMALISED KERMA & COMPOSITE FISSION RESPONSE FUNCTIONS.

COMPOSITE FISSION DOSEMETER FOR FAST NEUTRONS

The present invention concerns a neutron dosemeter based on fission reactions and is particularly, but not especially, concerned with dosimetry of fast neutrons.

Previous neutron dose measurements using fission devices have been based on threshold detector techniques and implicit in analysis of this kind is a knowledge of the neutron spectrum, and it is accordingly a complex task to apply this known neutron dose measurement technique in unknown neutron fields.

According to the present invention there is provided a method of measuring neutron doses comprising providing a composite detector material for the neutrons consisting of at least two fissile elements, the fission cross-section versus neutron energy response curves of which combine to match the kerma versus neutron energy response of a known biological material.

The biological material to be matched may, for example, be tissue, bone, or in some cases water.

In accordance with another aspect of the present invention there is provided a neutron dosemeter having a composite detector material for the neutrons consisting of at least two fissile elements, the fission cross-section versus neutron energy response curves of which combine to match the kerma versus neutron energy response of a known biological material.

Preferably two of the fissile elements are $237_{Np}$ and $238_U$ and these may be present in the range 30% to 11% $237_{Np}$ and 70% to 89% $238_U$, respectively, by weight.

An explanation of the present invention by way of example will now be given and reference made to the graph accompanying this specification.

The accompanying graph shows the tissue kerma as a function of neutron energy and a calculated composite fission response curve. The calculated composite fission response curve is in broken line. For comparison, both response functions are normalised at 15 MeV neutron energy. The proportions by weight of the fissile element of the composite fission device have been chosen to match the composite fission cross-section versus neutron energy response curve to the kerma response of tissue in the 11–15 MeV neutron energy region and was 29% $237_{Np}$ and 71% $238_U$ by weight.

The degree to which matching has been achieved is shown in the following table which compares the relative doses calculated from the kerma versus neutron energy response function for tissue with those deduced from the composite fission cross-section versus neutron energy response function using histograms with 30 equal division intervals in the energy region 0.1 to 15 MeV neutron energy representing various forms of neutron spectra. It is apparent from the table that this composite fission device will predict the neutron dose to within 5% of that calculated from kerma in almost any fast neutron field.

Furthermore the absolute neutron dose or dose rate can be measured since the detector sensitivity to 15 MeV neutrons can be directly related to the kerma value at the same energy.

Devices of various design can be constructed using the principle of composite fissile materials to measure neutron doses.

For example, it may be used in a known type of pulse fission chamber which can provide a digital or analogue output via simple associated electronics. Alternatively a fission track imagining method may be employed. In such a case the fissile materials would be mounted on a polycarbonate converter foil and this would provide a permanent record of the neutron dose.

A layer of fissile material on a foil can be produced from a solution containing the correct relative weights of the elements required for the particular application by deposition in a thin oxide layer.

Furthemore, separate fission foils each bearing a fissile material could be used with masks designed to expose the correct relative areas of foil. This has the advantage that the calibration of the separate components which combine to match the required tissue kerma response can be checked independently. Furthermore, foils can be interchanged and different areas exposed thus rendering the dose meter more flexible.

Although the previous description has been concerned with combining two fissile elements to obtain a composite fission response function which matches the kerma response of tissue, naturally by using different compositions different kermas may be matched. Thus if it is required to match the kerma of water, then the composition of the composite fission device would be 30% $237_{Np}$ and 70% $238_U$ by weight, and 11% $237_{Np}$ and 89% $238_U$ by weight for bone kerma.

A dosemeter constructed in accordance with the above description has several features which combine to give it advantages over previously available devices which measure neutron dose.

These features are as follows:
1. lack of sensitivity to electron or gamma radiation,
2. the devices can be used actively to record neutron doses during irradiation or passively to provide a permanent record of the dose,
3. the size and sensitivity of the device can be chosen to suit a particular application,
4. the operation of the devices is very stable.

TABLE 1

Comparison of Composite Fission and Kerma Doses.

| SPECTRUM TYPE | AGREEMENT OF RELATIVE DOSE CALCULATED FROM COMPOSITE FISSION DETECTOR WITH KERMA |
|---|---|
| RECTANGLE WITH N(E) = 1 FROM E = 0.1 MeV TO 15 MeV. | + 1.5% |
| TRIANGLE WITH N(E) = O AT E = 0.1 MeV TO N(E) = 1 AT 15 MeV. | + 3.5% |
| TRIANGLE WITH N(E) = 1 AT E = 0.1 MeV TO N(E) = 0 AT 15 MeV | − 0.5% |
| $^{252}$Cf SPONTANEOUS FISSION NEUTRON SOURCE. | − 6.5% |
| Pu-Be $(\alpha,\eta)$. | + 1.5% |
| TYPICAL CYCLOTRON SPECTRUM OF 15 MeV DEUTERONS ON THICK Be TARGET. | + 0.5% |
| SPECTRUM FROM D-T GENERATOR AFTER PASSING THROUGH 25 cm OF TISSUE EQUIVALENT MATERIAL. | − 3.0% |

We claim:

1. A method of measuring neutron doses comprising providing a composite detector material for the neutrons consisting of at least two fissile elements, the fission cross-section versus neutron energy response curves of which combine to match the kerma versus neutron energy response of a known biological material and exposing said detector material to neutrons and said elements including $237_{Np}$ in the range of 30% to 11% and $238_U$ in the range of 70 to 89%, respectively by weight.

* * * * *